United States Patent
Peyser et al.

(10) Patent No.: US 7,076,447 B1
(45) Date of Patent: Jul. 11, 2006

(54) SYSTEMS AND METHODS FOR AGGREGATING BUYERS FOR THE PURCHASE OF TELECOMMUNICATION SERVICES VIA A NETWORK

(75) Inventors: Charles A. Peyser, Bethesda, MD (US); Constance Beyer, McLean, VA (US); Michael D. McLaughlin, Saratoga, CA (US)

(73) Assignee: InPhonic, Inc., Washington, DC (US)

( * ) Notice: Subject to any disclaimer, the term of this patent is extended or adjusted under 35 U.S.C. 154(b) by 0 days.

(21) Appl. No.: 09/390,025

(22) Filed: Sep. 3, 1999

Related U.S. Application Data

(60) Provisional application No. 60/138,509, filed on Jun. 10, 1999.

(51) Int. Cl.
*G06F 17/60* (2006.01)

(52) U.S. Cl. .................................................. 705/26

(58) Field of Classification Search ............... 705/26, 705/37
See application file for complete search history.

(56) References Cited

U.S. PATENT DOCUMENTS

| | | | | |
|---|---|---|---|---|
| 4,799,156 A | * | 1/1989 | Shavit et al. | 360/74.1 |
| 4,903,201 A | * | 2/1990 | Wagner | 705/37 |
| 5,027,388 A | * | 6/1991 | Bradshaw et al. | 379/114.1 |
| 5,265,155 A | * | 11/1993 | Castro | 379/114.2 |
| 5,682,525 A | | 10/1997 | Bouve et al. | 707/104.1 |
| 5,710,887 A | * | 1/1998 | Chelliah et al. | 345/835 |
| 5,758,328 A | | 5/1998 | Giovannoli | 705/26 |
| 5,794,207 A | | 8/1998 | Walker et al. | 705/23 |
| 5,794,219 A | * | 8/1998 | Brown | 705/26 |

(Continued)

FOREIGN PATENT DOCUMENTS

JP 9-212549 A * 8/1997

OTHER PUBLICATIONS

Salazar, K, "The Fight Against Slamming and Cramming," Press Release, http://www.ago.state.co.us/PRESREL/presrl00/prsrl4.htm, Jan. 21, 2000.*
Anon., "Bell Offers Answers for Commonly Asked Questions," St. Louis Business Journal, vol. 7, No. 26, s. 3, p. 1C, Mar. 23, 1987.*
Anon., "Industry.Net Teams with PNC Bank on Web Commerce," Newsbytes News Network, Sep. 26, 1996.*
Anon., "Accompany, Inc., to Revolutionize Commerce; Buyers Come Together for Best Value," PR Newswire, Mar. 3, 1999.*
Demandline.com: How Demandline.com Works, http://www.demandline.com, 6 pages (accessed Jan. 6, 2000).
Accompany—Internet Purchasing through aggregation, access & advocacy, http://www.accompany.com, 3 pages.
Telezoo.com: telecommunications Mar . . . Products and Connectivity Services, http://www.telezoo.com, 5 pages.
Anon., "Third–Party Phone Films' Troubles Told," Denver Post, C–02, Mar. 23, 1994.*
Dennis, S., "Electric Lightware Ready to Offer Local Number Portability May 21, 1998," Newsbytes, May 21, 1998.*
Anon., "NaviNet to Showcase Next Generation Dial–up IP Services," Business Wire, Jun. 2, 1999.*

*Primary Examiner*—Nicholas D. Rosen
(74) *Attorney, Agent, or Firm*—Patton Boggs, LLP

(57) ABSTRACT

A system facilitates the purchase of telecommunication services from a variety of sellers. The system aggregates buyers for purchasing at least one telecommunication service as a group, generates a request for purchasing the telecommunication services, provides the request to the sellers, and receives replies from the sellers in response to the request. The system then provides the replies to the group, receives a selection from the group in response to the replies, and notifies a seller of the selection.

21 Claims, 15 Drawing Sheets

U.S. PATENT DOCUMENTS

| | | | |
|---|---|---|---|
| 5,815,665 A | 9/1998 | Teper et al. | 709/229 |
| 5,832,457 A * | 11/1998 | O'Brien et al. | 705/14 |
| 5,835,896 A * | 11/1998 | Fisher et al. | 705/27 |
| 5,845,265 A | 12/1998 | Woolston | 705/37 |
| 5,862,223 A | 1/1999 | Walker et al. | 705/50 |
| 5,864,604 A * | 1/1999 | Moen et al. | 379/114.05 |
| 5,881,131 A | 3/1999 | Farris et al. | 379/15.03 |
| 5,897,620 A | 4/1999 | Walker et al. | 705/5 |
| 5,905,975 A | 5/1999 | Ausubel | 705/37 |
| 5,917,897 A | 6/1999 | Johnson et al. | |
| 5,949,875 A | 9/1999 | Walker et al. | 702/78 |
| 6,006,251 A | 12/1999 | Toyouchi et al. | 709/203 |
| 6,023,685 A | 2/2000 | Brett et al. | 705/37 |
| 6,023,686 A * | 2/2000 | Brown | 705/37 |
| 6,055,504 A * | 4/2000 | Chou et al. | 705/1 |
| 6,085,171 A * | 7/2000 | Leonard | 235/375 |
| 6,104,798 A | 8/2000 | Lickiss et al. | 379/201.12 |
| 6,128,742 A * | 10/2000 | Felt | 713/202 |
| 6,131,087 A * | 10/2000 | Luke et al. | 705/26 |
| 6,144,727 A | 11/2000 | Mashinsky | |
| 6,205,211 B1 | 3/2001 | Thomas et al. | |
| 6,222,536 B1 | 4/2001 | Kihl et al. | 709/203 |
| 6,226,365 B1 | 5/2001 | Mashinsky | |
| 6,233,566 B1 | 5/2001 | Levine et al. | 705/37 |
| 6,260,024 B1 * | 7/2001 | Shkedy | 705/10 |
| 6,269,157 B1 | 7/2001 | Coyle | 379/114.01 |
| 6,269,343 B1 * | 7/2001 | Pallakoff | 705/26 |
| 6,298,125 B1 * | 10/2001 | Goldberg et al. | 379/114.1 |
| 6,301,574 B1 * | 10/2001 | Thomas et al. | 705/26 |
| 6,385,594 B1 | 5/2002 | Lebda et al. | 705/38 |
| 6,418,415 B1 * | 7/2002 | Walker et al. | 705/26 |
| 6,584,451 B1 * | 6/2003 | Shoham et al. | 705/37 |
| 6,598,026 B1 | 7/2003 | Ojha et al. | |
| 6,631,356 B1 * | 10/2003 | Van Horn et al. | 705/26 |
| 2002/0001372 A1 | 1/2002 | Katz | 379/93.12 |
| 2003/0126040 A1 * | 7/2003 | Mesaros | 705/26 |

* cited by examiner

242

| RFP NO. 1 | BUYER INFO | TYPES OF SERVICE | QUESTIONS | PRIOR USAGE |
| RFP NO. 2 | BUYER INFO | TYPES OF SERVICE | QUESTIONS | PRIOR USAGE |
| RFP NO. 3 | BUYER INFO | TYPES OF SERVICE | QUESTIONS | PRIOR USAGE |
| ... | | | | |
| RFP NO. N | BUYER INFO | TYPES OF SERVICE | QUESTIONS | PRIOR USAGE |
| 310 | 320 | 330 | 340 | 350 |

| BUYER ID NAME | RFP NO. N1 | RFP REPLY 1 | RFP REPLY 2 | ... | RFP REPLY N |
| | RFP NO. N2 | RFP REPLY 1 | RFP REPLY 2 | ... | RFP REPLY M |
| | RFP NO. N3 | RFP REPLY 1 | RFP REPLY 2 | ... | RFP REPLY L |
| ... | | | | | |
| BUYER ID NAME | RFP NO. M1 | RFP REPLY 1 | RFP REPLY 2 | ... | RFP REPLY N |
| 360 | 370 | 380 | | | |

FIG. 3B

SYSTEMS AND METHODS FOR AGGREGATING BUYERS FOR THE PURCHASE OF TELECOMMUNICATION SERVICES VIA A NETWORK

RELATED APPLICATIONS

This application claims priority from U.S. Provisional Application No. 60/138,509, entitled "Methods For Providing Telecommunications Service Buying and Selling Via the Internet," filed on Jun. 10, 1999, which is incorporated herein by reference. This application is related to copending U.S. application Ser. No. 09/380,026, entitled "Systems and Methods For Buying and Selling Telecommunication Services Via a Network," which is assigned to the same assignee and filed on the same date as this application, and also incorporated herein by reference.

FIELD OF THE INVENTION

The present invention relates generally to the purchase of telecommunication services and, more particularly, to a forum through which buyers can purchase telecommunication services from a variety of sellers via a network, such as the Internet.

BACKGROUND OF THE INVENTION

Traditionally, telecommunication services, such as local, long distance, Internet, cellular services, etc., have been bought and sold through the interaction of people. Typically, the buy-sell process takes one of two forms: (1) a buyer determines the necessary telecommunication service requirements and contacts one or more sellers of these services; or (2) a seller proactively solicits the buyer, who may or may not be ready to purchase the services.

For larger-sized companies, the service requirements are usually complex and the buyer sophisticated. Therefore, the first form typically predominates (i.e., a buyer initiates the communication with a seller in these instances). For small and medium-sized companies, as well as for consumers, the service requirements are usually much less complex and the buyer less sophisticated. Therefore, the second form typically predominates. The seller contacts the buyer via different methods, such as door-to-door canvassing, telemarketing, direct mailing, advertising, etc.

A major disadvantage of the conventional buy-sell process is that sellers typically control the process. This is especially true in the case of consumers, small businesses, and associations. As a result, it is often difficult for these buyers to get the best possible deal.

Therefore, there is a need to shift control to buyers in the purchase of telecommunication services.

SUMMARY OF THE INVENTION

Systems and methods consistent with the present invention address this need by aggregating buyer purchase power in the purchase of telecommunication services.

In accordance with the purpose of the invention as embodied and broadly described herein, a system consistent with the present invention facilitates the purchase of telecommunication services from a variety of sellers. The system aggregates a plurality of buyers for purchasing at least one telecommunication service as a group, generates a request for purchasing the telecommunication services, provides the request to the sellers, and receives replies from the sellers in response to the request. The system then provides the replies to the group and receives a selection from the group in response to the replies. The system notifies a seller of the selection.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3A is an exemplary diagram of the request for proposal (RFP) database of FIG. 2;

FIG. 3B is an exemplary diagram of the buyer database of FIG. 2;

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a form through which buyers and sellers of telecommunication services interact. The buyers specify the types of services desired and the sellers submit proposals for providing the services. The buyers select the proposals that meet their requirements and contract with the particular sellers to provide the desired services and/or additional services.

System Elements

Figure 1:
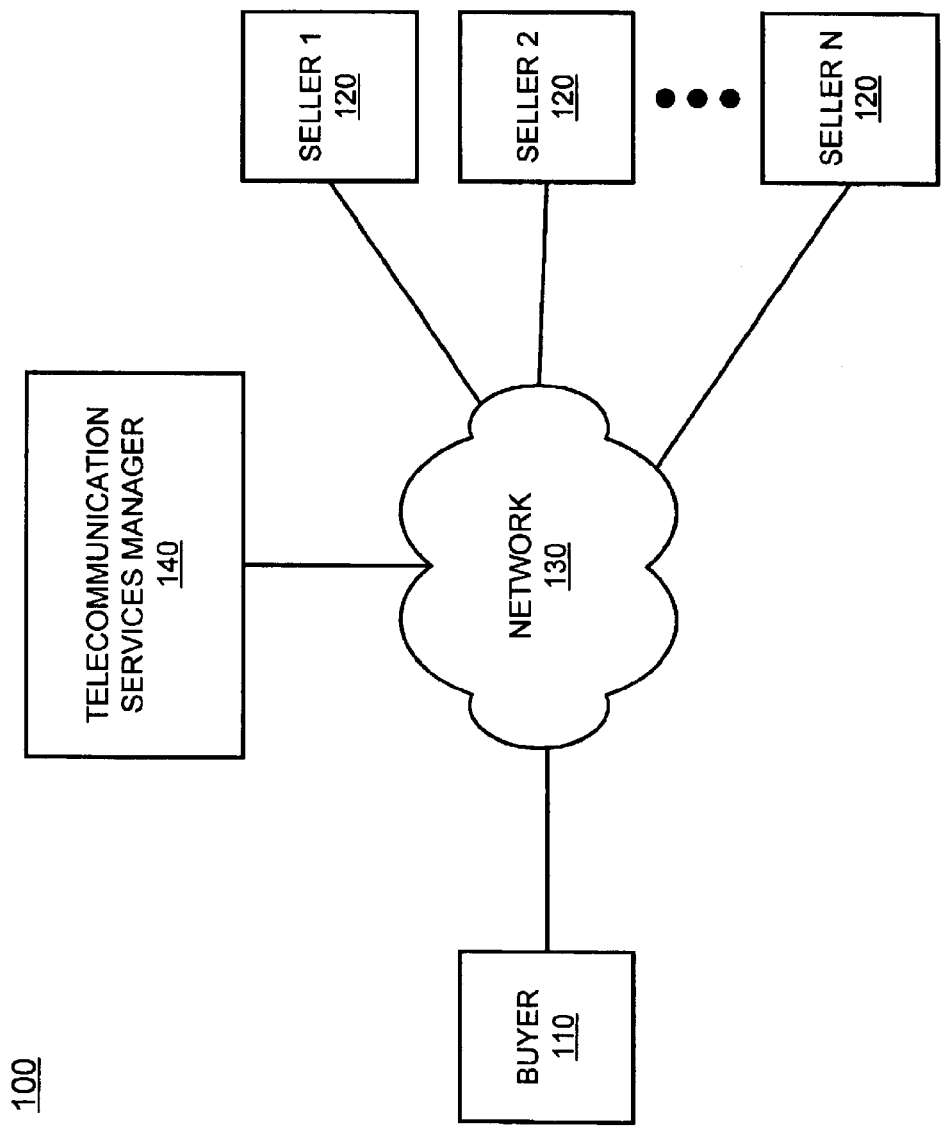
FIG. 1 is an exemplary diagram of a system consistent with the present invention.

FIG. 1 is an exemplary diagram of a system 100 consistent with the present invention. The system 100 includes a buyer terminal 110 connected to several seller terminals 120 via a network 130. The system also includes a telecommunication services manager 140 connected to the buyer and seller terminals 110 and 120, respectively, via the network 130.

The buyer terminal 110 may include a personal computer, such as an IBM-compatible computer, or the like, with a connection to the network 130. A single buyer terminal 110 has been shown for simplicity. Those skilled in the art will note that the present invention contemplates more than one buyer terminal 110 connected to the network 130. The seller terminals 120 may also include personal computers with connections to the network 130. The network 130 may include the Internet, an intranet, or some equivalent data network.

Figure 2:
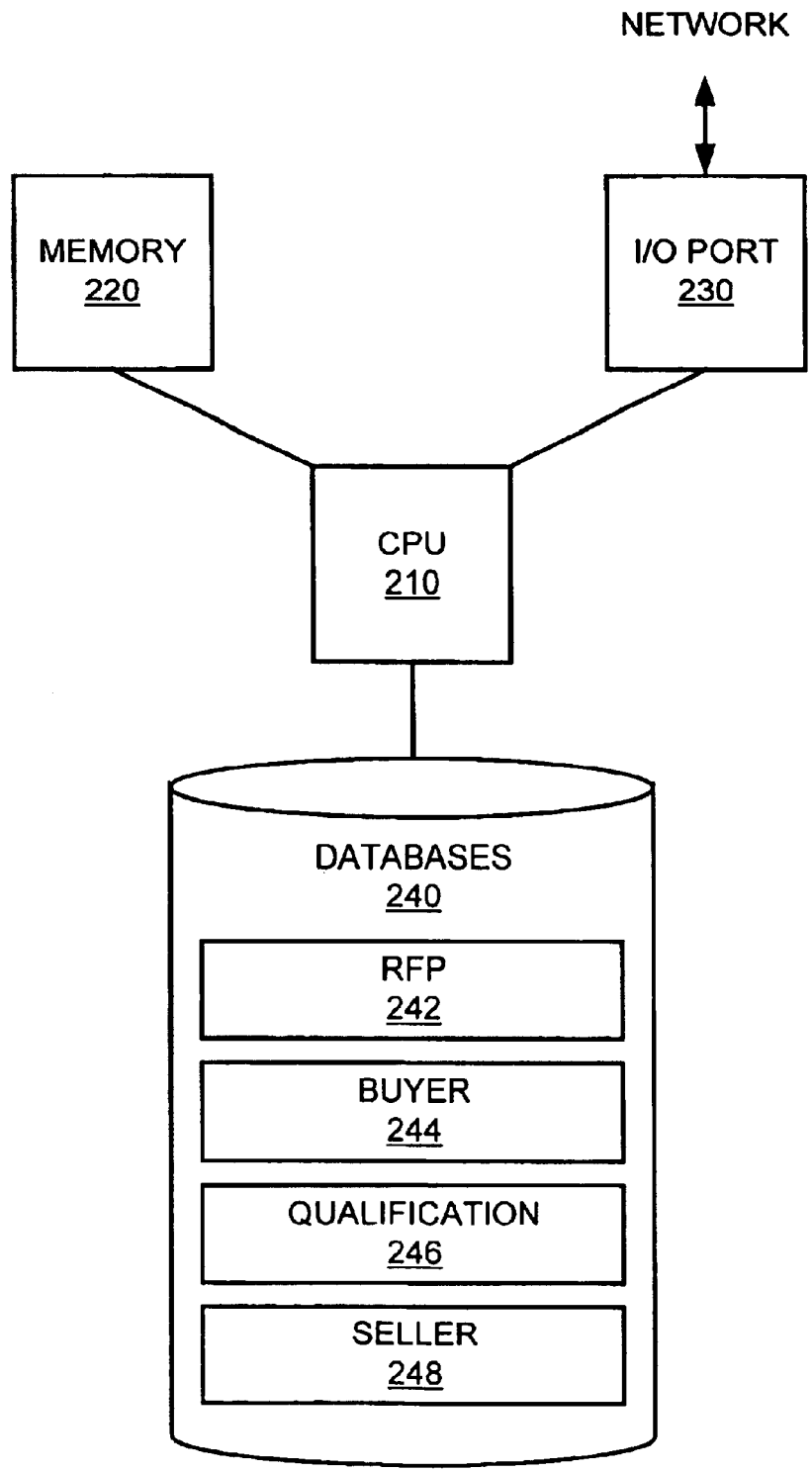
FIG. 2 is an exemplary diagram of the telecommunication services manager of FIG. 1.

The telecommunication services manager (TSM) 140 provides a forum through which the buyer terminal 110 can interact with the seller terminals 120 to purchase telecommunication services. FIG. 2 is an exemplary diagram of TSM 140, including a processor 210, at least one memory 220, an input/output (I/O) port 230, and a set of databases 240. The processor 210 may include any conventional microprocessor, such as a Pentium produced by Intel. The memory 220 includes one or more conventional storage devices, such as RAM, ROM, EEPROM, etc. The I/O port 230 is a conventional communication port for communicating with the network 130.

The databases 240 include a large capacity storage device that contains at least four sets of databases: a request for proposal (RFP) database 242, a buyer database 244, a qualification database 246, and a seller database 248. The RFP database 242 stores RFPs prepared by buyers.

FIG. 3A is an exemplary diagram of the RFP database 242. Each entry in the RFP database 242 includes multiple fields for information on an RFP, including an RFP number 310, buyer information 320, types of service data 330, question data 340, and prior usage data 350. The RFP number 310 uniquely identifies a particular RFP. The buyer information 320 includes information describing the buyer, including, for example, the buyer's name, address, location, company, possibly information on other buyers (e.g., others referred to TSM 140 by the buyer), credit information, etc. This information may be provided by the buyer or obtained from one or more commercial databases.

The types of service data 330 includes information identifying the services that the buyer wishes to purchase. The question data 340 includes particular questions for the sellers posed by the buyer. The prior usage data 350 includes data regarding prior telephone service usage by the buyer and/or estimates or assumptions on such usage derived from the buyer's answers to a set of queries provided by TSM 140.

The buyer database 244 (FIG. 2) stores RFP replies. An RFP reply is a seller's answer to an RFP. FIG. 3B is an exemplary diagram of the buyer database 244. Each entry in the buyer database 244 includes multiple fields for information regarding an RFP, including a buyer ID name 360, an RFP number 370, and one or more RFP replies 380. The buyer ID name 360 uniquely identifies a buyer. The RFP number 370 is the same as the RFP number 310 that uniquely identifies an RFP. There may be more than one RFP number 370 associated with a single buyer, if the buyer submitted more than one RFP. Each of the RFP replies 380 includes a seller's response to the buyer's RFP.

The qualification database 246 (FIG. 2) stores rules for qualifying a buyer to use the system 100. The database 246 includes rules, for example, that validate the identity of a buyer by comparing the buyer's contact information, social security number, or federal tax identification to a commercially available database or by analyzing the buyer's email address. Of course, other qualification rules may be used.

The seller database 248 stores seller information, such as boilerplate RFP replies and filter data, and may contain an area for the sellers to store data. The filter data contains criteria provided by the sellers as to the types of RFPs they want to receive. For example, a seller might indicate that they will provide service to only particular areas and desire RFPs requesting service in these areas.

Processing for Purchasing Telecommunication Services

Figure 4:
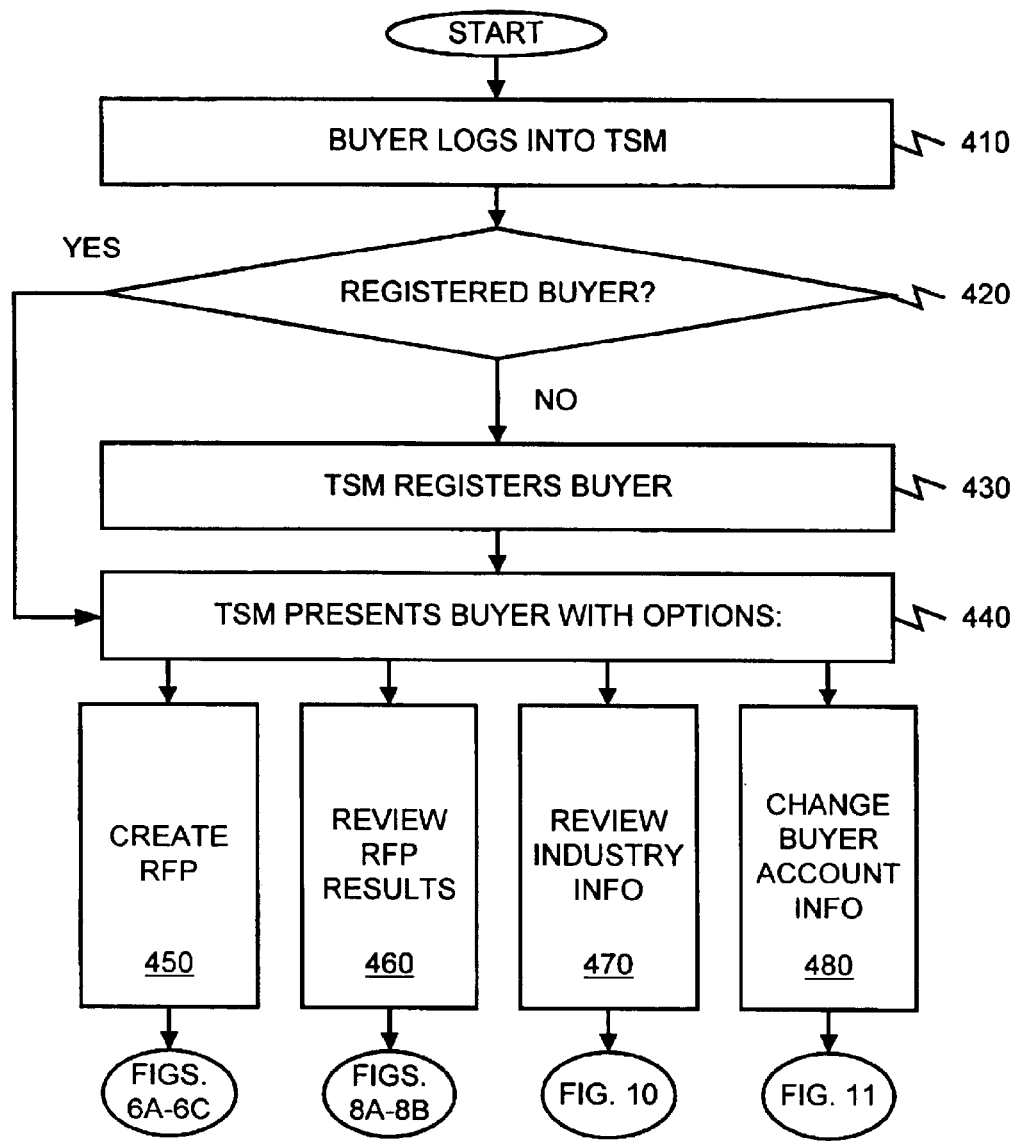
FIG. 4 is a flowchart of processing for purchasing telecommunication services in a manner consistent with the present invention.

FIG. 4 is a flowchart of processing for purchasing telecommunication services in a manner consistent with the present invention. The processing begins when a buyer, using buyer terminal 110, logs into TSM 140 via the network 130 [step 410]. The buyer may do this directly by using a conventional modem or some other connection or indirectly by entering an Internet address to access TSM's web site on the world wide web.

Once logged in, TSM 140 determines whether the buyer is registered, for example, by requiring the buyer to enter a login identifier and password [step 420]. It is also possible to store this information in a special file on the buyer terminal 110 so that when the buyer accesses the TSM web site, the stored information is provided automatically to TSM 140 for verification. If the buyer has not previously registered, TSM 410 registers the buyer [step 430].

Figure 5:
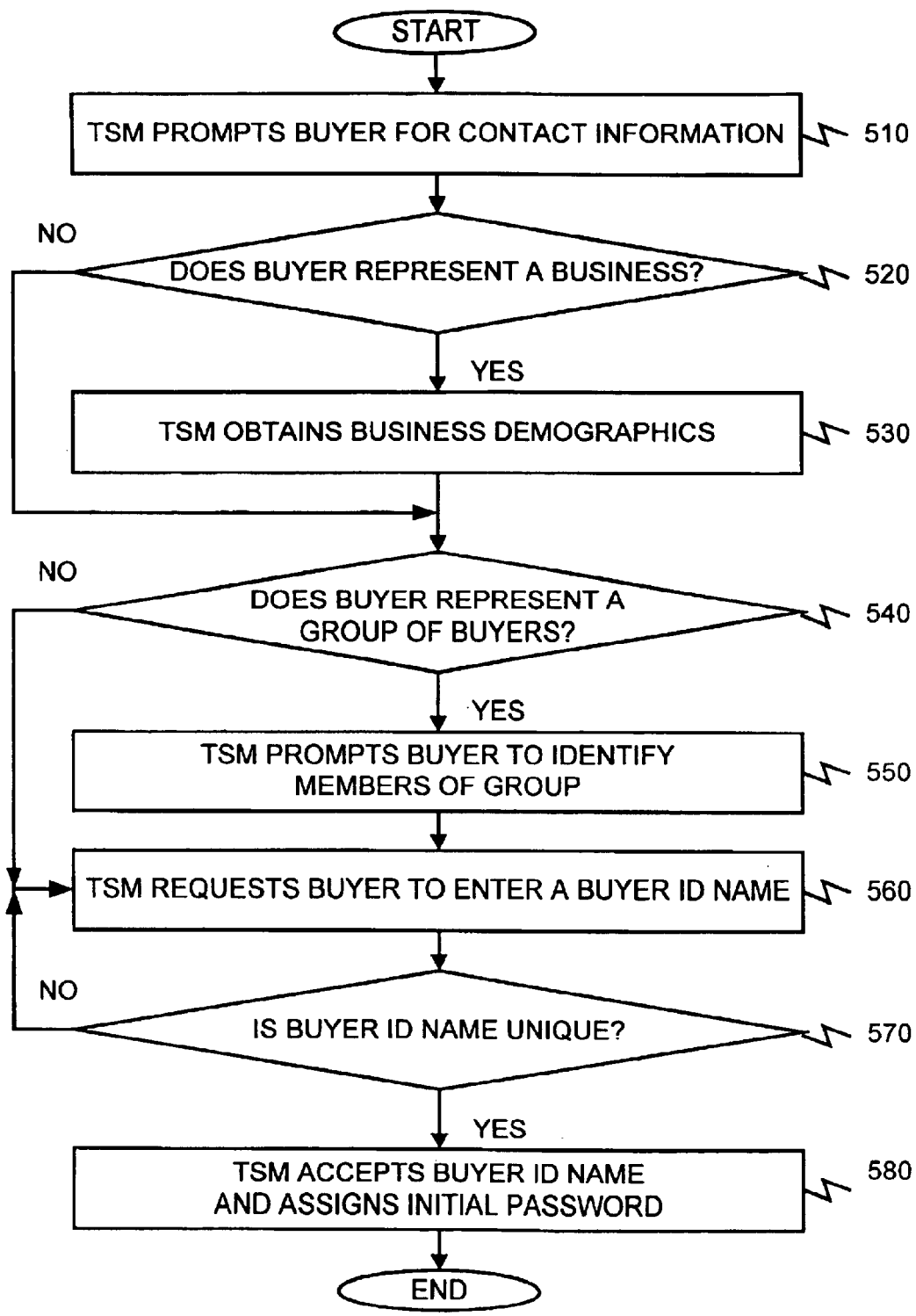
FIG. 5 is a flowchart of processing for registering a buyer in a manner consistent with the present invention.

FIG. 5 is a flowchart of processing for registering a buyer in a manner consistent with the present invention. TSM 140 prompts the buyer to enter contact information [step 510]. The contact information might include the buyer's name, title, telephone and fax numbers, email address, and/or the name of the buyer's business. From this information, TSM 140 determines whether the buyer represents a business [step 520]. If so, TSM 140 prompts the buyer for business demographics, including, for example, the company size, industry, number of locations, whether there are any international sites, typical monthly spending on telecommunication services, etc. [step 530]. Alternatively or additionally, TSM 140 accesses a commercial database to obtain this information.

Once TSM 140 obtains the business demographics or if the buyer does not represent a business, TSM 140 determines whether the buyer represents a group of buyers [step 540]. The buyer may represent a group of buyers, such as a group of family and friends, association members, a group of small businesses, etc., that have previously agreed, or have agreed based on a recommendation of TSM 140, to submit an RFP for their telecommunication services. The seller that wins the selection provides service to all members of the group, though some members may be permitted to later drop out. This aggregation of buyers helps the buyers obtain a better price from the sellers by combining their purchasing power. If the buyer represents a group, TSM 410 prompts the buyer to identify the group representative and the members of the group by name or number (i.e., size) [step 550].

Once TSM 140 obtains the group information or if the buyer does not represent a group, TSM 140 requests that the buyer enter a buyer ID name [step 560]. The buyer ID name uniquely identifies the buyer and typically consists of several alphanumeric characters. TSM 140 then determines whether the ID name that the buyer entered is unique, possibly by comparing the name with a database of previously entered names [step 570]. If the name has already been taken, TSM 140 informs the buyer to enter another name [step 560]. TSM 140 then accepts the unique buyer ID name and assigns an initial password [step 580]. TSM 140 may then send the initial password to the buyer via email, regular mail, or by other mechanisms.

Once the buyer successfully registers, TSM 140 presents the buyer with several options [step 440] (FIG. 4): (1) to create an RFP; (2) to review results of previously submitted RFPs; (3) to review industry information; and (4) to change buyer account information. If the buyer decides to create an RFP [step 450], processing continues with the flowcharts of FIGS. 6A–6C. If the buyer decides to review results of previously submitted RFPs [step 460], processing continues with the flowcharts of FIGS. 8A and 8B. If the buyer decides to review industry information [step 470], processing continues with the flowchart of FIG. 10. Finally, if the buyer decides to change account information [step 480], processing continues with the flowchart of FIG. 11.

Processing for Creating an RFP

Figure 6A:
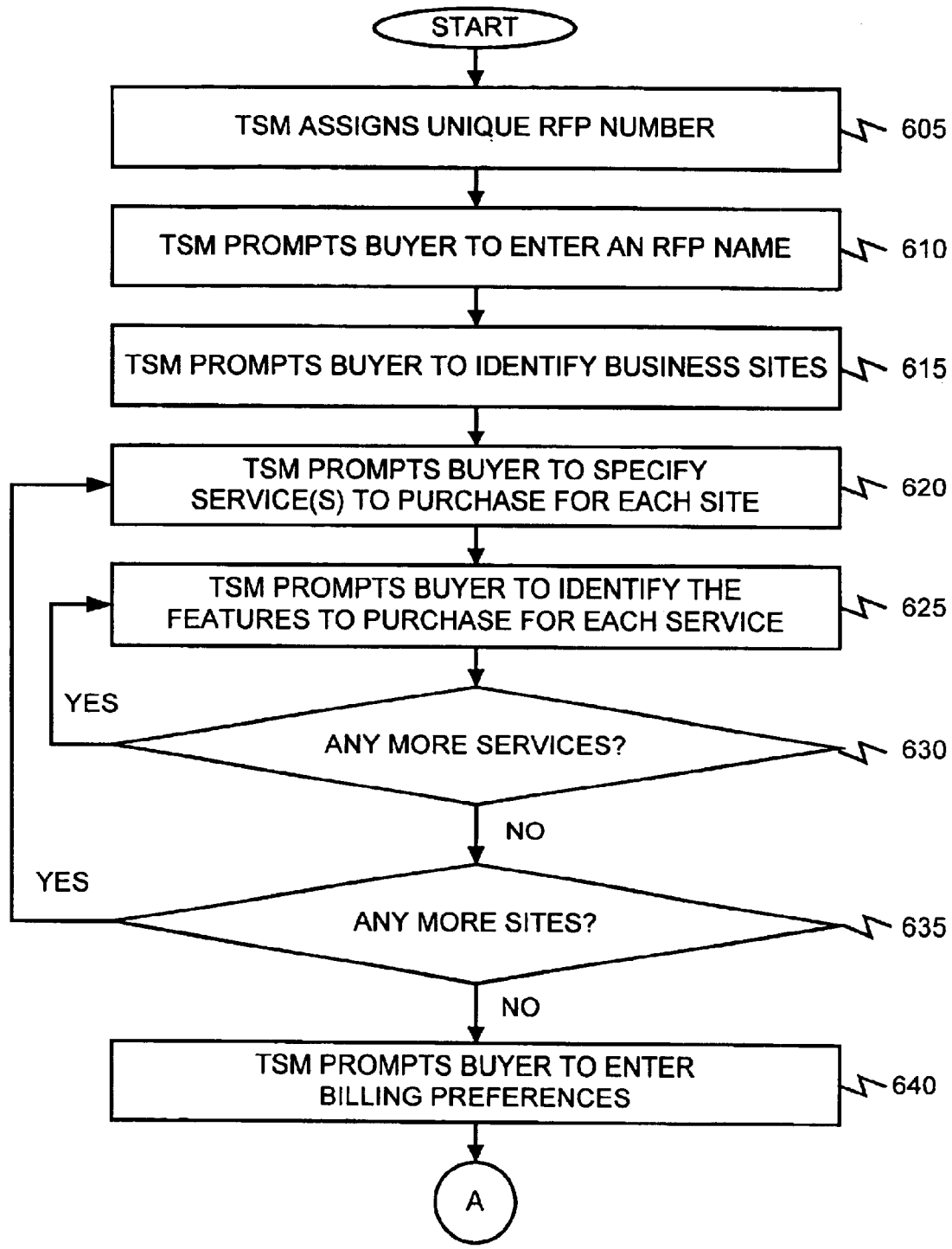
FIGS. 6A–6C are flowcharts of processing for creating an RFP in a manner consistent with the present invention.
Figure 6B:
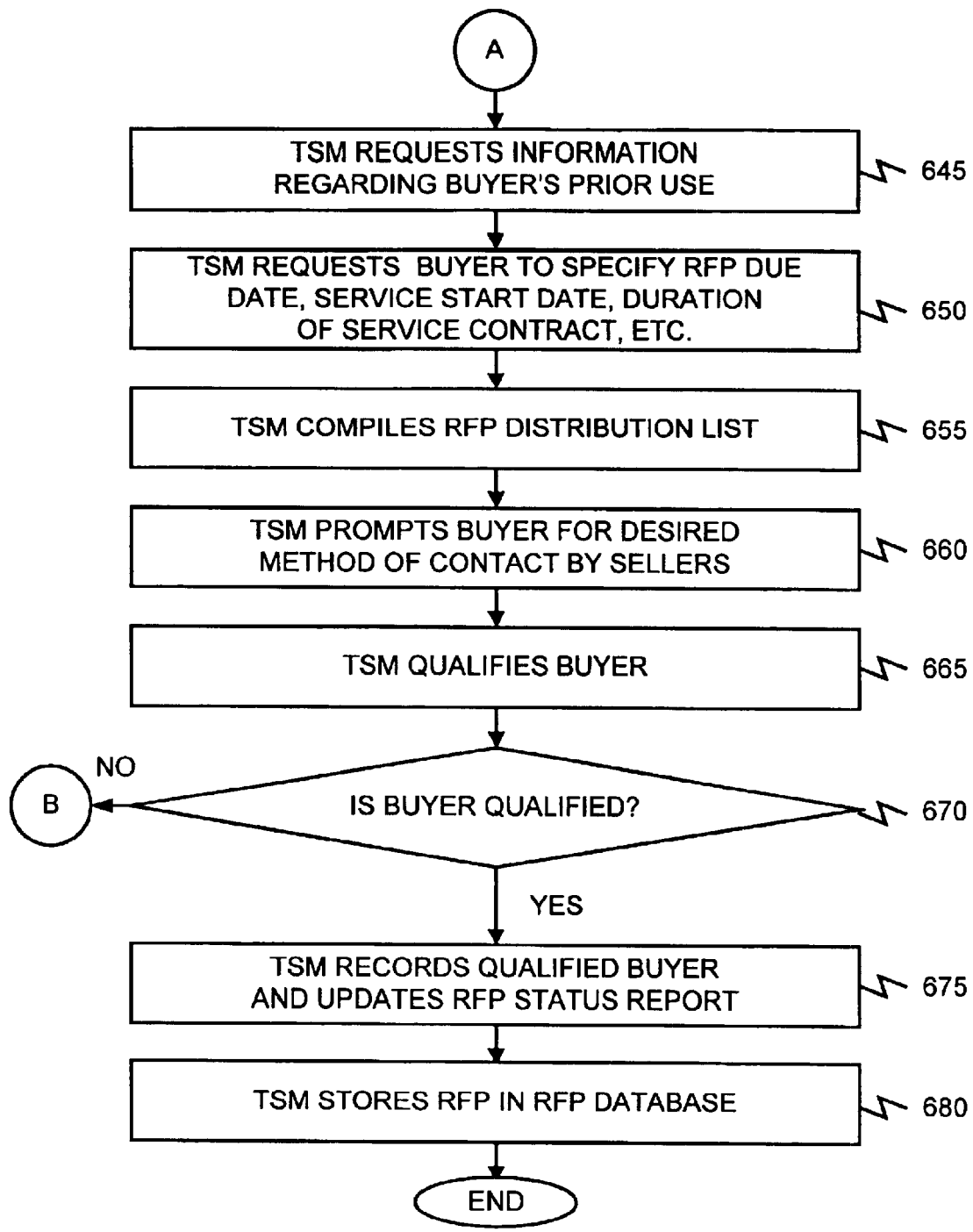
Figure 6C:
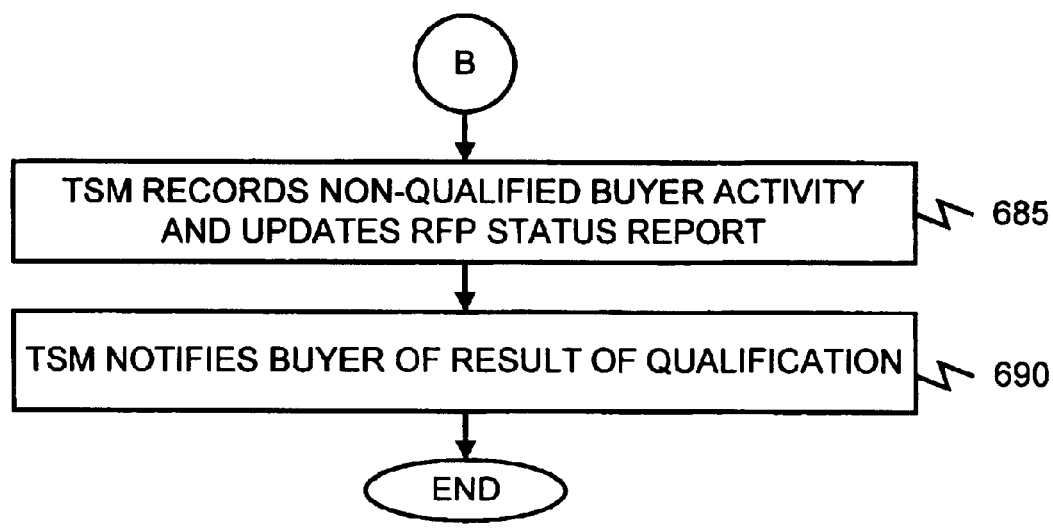

FIGS. 6A–6C are flowcharts of processing for creating an RFP in a manner consistent with the present invention. Although a series of steps is provided, the order of the steps does not matter. When the buyer chooses to create an RFP, TSM 140 generates a unique RFP number for it [step 605] (FIG. 6A). TSM 140 then prompts the buyer to provide a descriptive name for the RFP [step 610].

Next, TSM 140 requests that the buyer identify the business sites for which service is sought [step 615]. TSM 140 prompts the buyer to specify the service(s) desired for each business site [step 620]. The buyer might select among several types of services, such as local, long distance, toll free, calling card, Internet, conference calling, private line/data, etc. Alternatively or additionally, the buyer might authorize TSM 140 to obtain customer service records from the buyer's local telephone company. For each service selected, TSM 140 prompts the buyer to identify the features to purchase [step 625]. The buyer might indicate that a feature is required, desired, or not wanted, and may indicate whether a service is new for the site or is replacing an already existing service.

Once the buyer identifies all the desired services for each site [steps 630 and 635], TSM 140 prompts the buyer for billing preference information [step 640]. The buyer specifies the name(s) and address(es) for the service bill. In certain instances, the buyer may also specify other billing parameters, such as the date upon which the bill will be due each month.

Next, TSM 140 requests that the buyer provide information regarding prior use of telecommunication services [step 645] (FIG. 6B). The buyer might provide copies of recent telecommunication service bills by fax, email, or regular mail or the buyer might enter this information into an electronic form provided by TSM 140. Alternatively, TSM 140 may access a database that contains this information. At this time, the buyer might also specify any changes to the prior usage. If no prior use data exists, such as in the case of a new company, the buyer might project the usage.

TSM 140 then prompts the buyer to specify the RFP dates, such as the RFP reply due date, the start of services date, and the duration of services date [step 650]. The RFP reply date is the date by which all sellers must respond. The start of services date is the date upon which the buyer wants the new services to begin. The duration of services date is the length of the service contract desired by the buyer. Typically, the buyer specifies service contract lengths in terms of six month increments. The buyer may also include one or more questions for potential sellers regarding their services.

Next, TSM 140 compiles an RFP distribution list [step 655]. TSM 140 may present an alphabetical list of participating sellers from which the buyer may select those to include on the RFP distribution list. Only those sellers included in the list will receive the buyer's RFP. TSM 140 then requests that the buyer identify preferred methods of contact by the sellers [step 660]. For example, the buyer might specify that the sellers communicate only through TSM 140, that the sellers communicate via regular mail, or that the sellers communicate directly with the buyer via email, telephone, etc.

TSM 140 qualifies the buyer according to the rules stored in the qualification database 246 to minimize the number of fraudulent RFPs submitted to the system 100 [step 665]. TSM 140 may qualify the buyer by comparing the buyer's contact information, social security number, or federal tax identification to a commercially available database, by analyzing the buyer's email address, or by other mechanisms to verify the identity of the buyer.

If the buyer passes the qualification process [step 670], TSM 140 records that the buyer is qualified and updates an RFP status report to change the status of the RFP from "Submitted" to "Distributed" [step 675]. TSM 140 then stores the RFP in the RFP database 242 [step 680].

If the buyer fails the qualification process [step 670], TSM 140 records the activity of the non-qualified buyer and updates the RFP status report to indicate so [step 685] (FIG. 6C). TSM 140 then notifies the buyer of the result of the qualification process [step 690]. If the buyer is a legitimate buyer, TSM 140 may permit the buyer to contact a service agent to prove the buyer's legitimacy.

Figure 7:
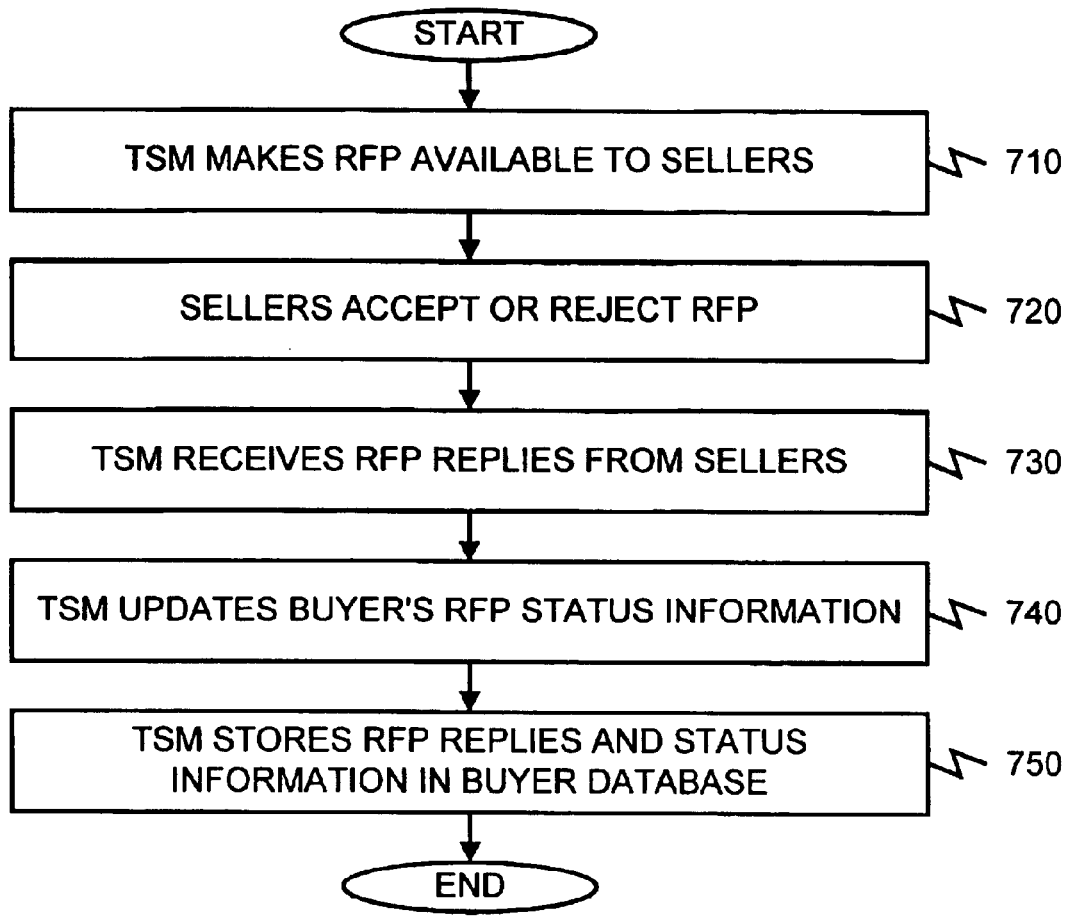
FIG. 7 is a flowchart of processing for distributing an RFP in a manner consistent with the present invention.

Once the buyer completes the RFP, TSM 140 distributes it. FIG. 7 is a flowchart of processing for distributing an RFP in a manner consistent with the present invention. TSM 140 uses the filter data in the seller database 248 to determine the manner for distributing the RFP to the sellers on the distribution list. In other words, TSM 140 analyzes the filter data corresponding to the sellers on the distribution list to identify which sellers will receive the RFP and makes it available to them [step 710]. Sellers may then access the RFP via the TSM web site with the appropriate log on identifier and password. Alternatively, TSM 140 might send the RFP to the sellers via email, regular mail, fax, etc.

Once the RFP is made available, the individual sellers determine whether to accept or reject it [step 720]. The sellers then generate replies for the RFP based on whether the RFP is accepted or rejected. TSM 140 receives the RFP replies from the sellers [step 730] and updates the buyer's RFP status information to indicate whether the RFP was accepted or rejected by the seller [step 740]. TSM 140 then stores the RFP replies and the status information in the buyer database 244 [step 750].

Processing for Reviewing RFP Results

Figure 8A:
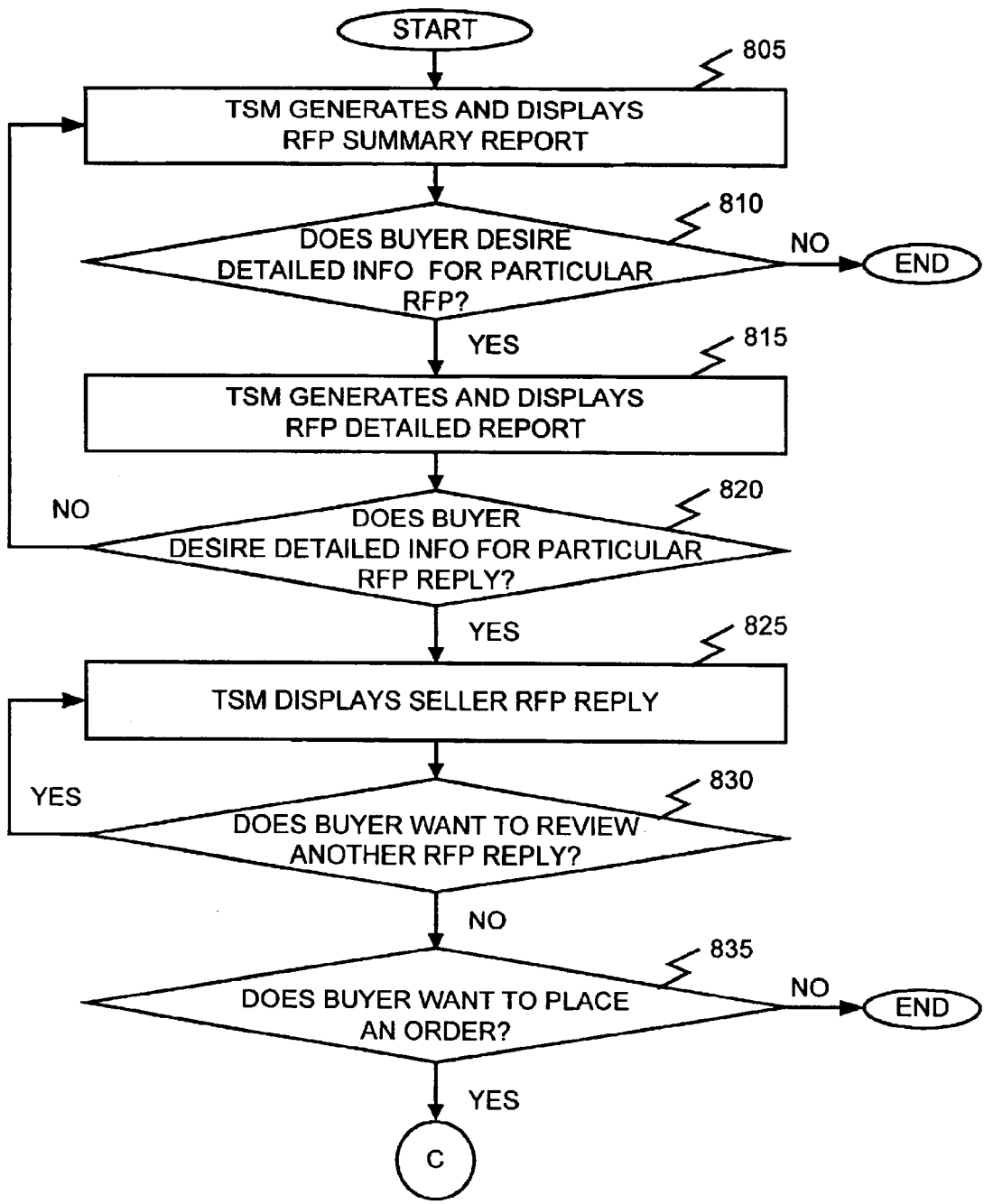
FIGS. 8A and 8B are flowcharts of processing for reviewing results of previously submitted RFPs in a manner consistent with the present invention.
Figure 8B:
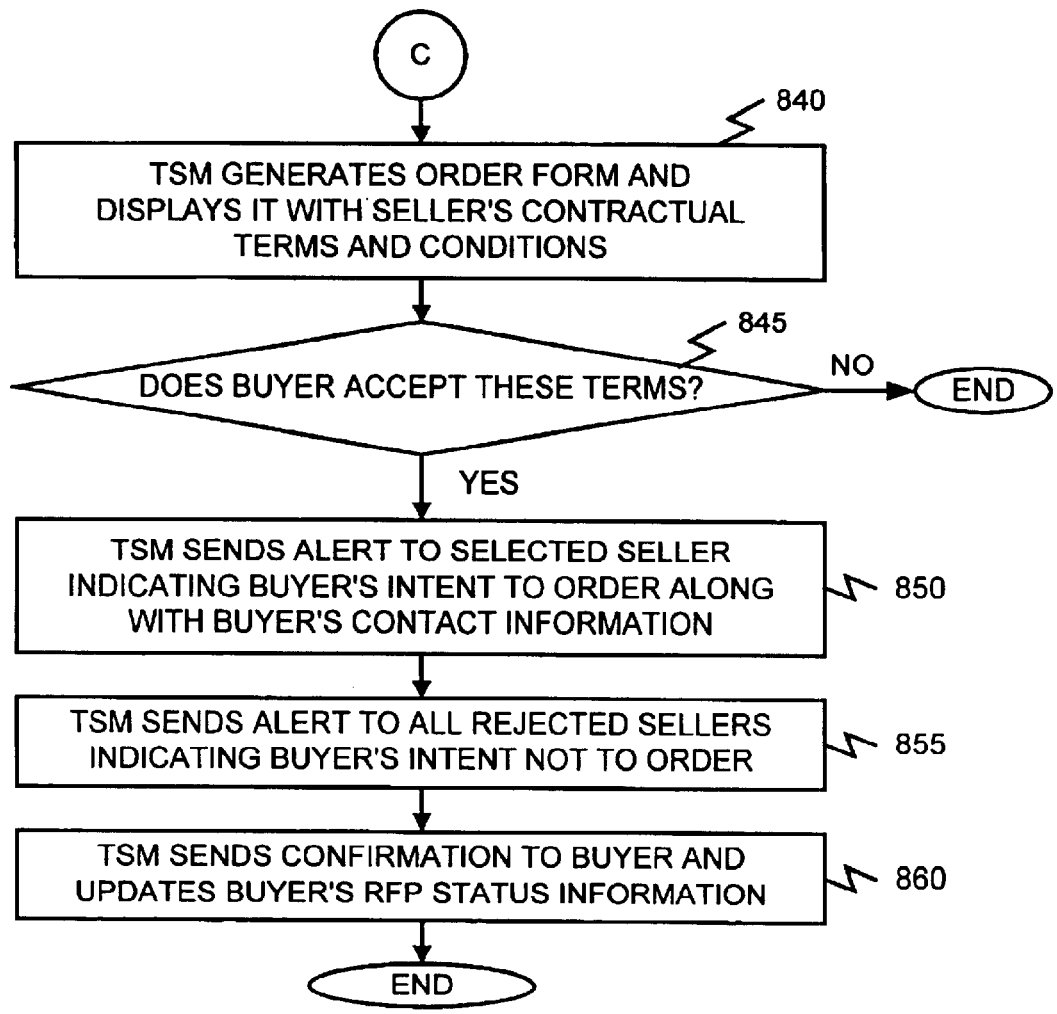

FIGS. 8A and 8B are flowcharts of processing for reviewing results of previously submitted RFPs in a manner consistent with the present invention. When a buyer wants to see the results of a previously submitted RFP, TSM 140 generates and displays an RFP summary report [step 805]. TSM 140 periodically updates the report as it receives RFP replies from the sellers.

Figure 9A:
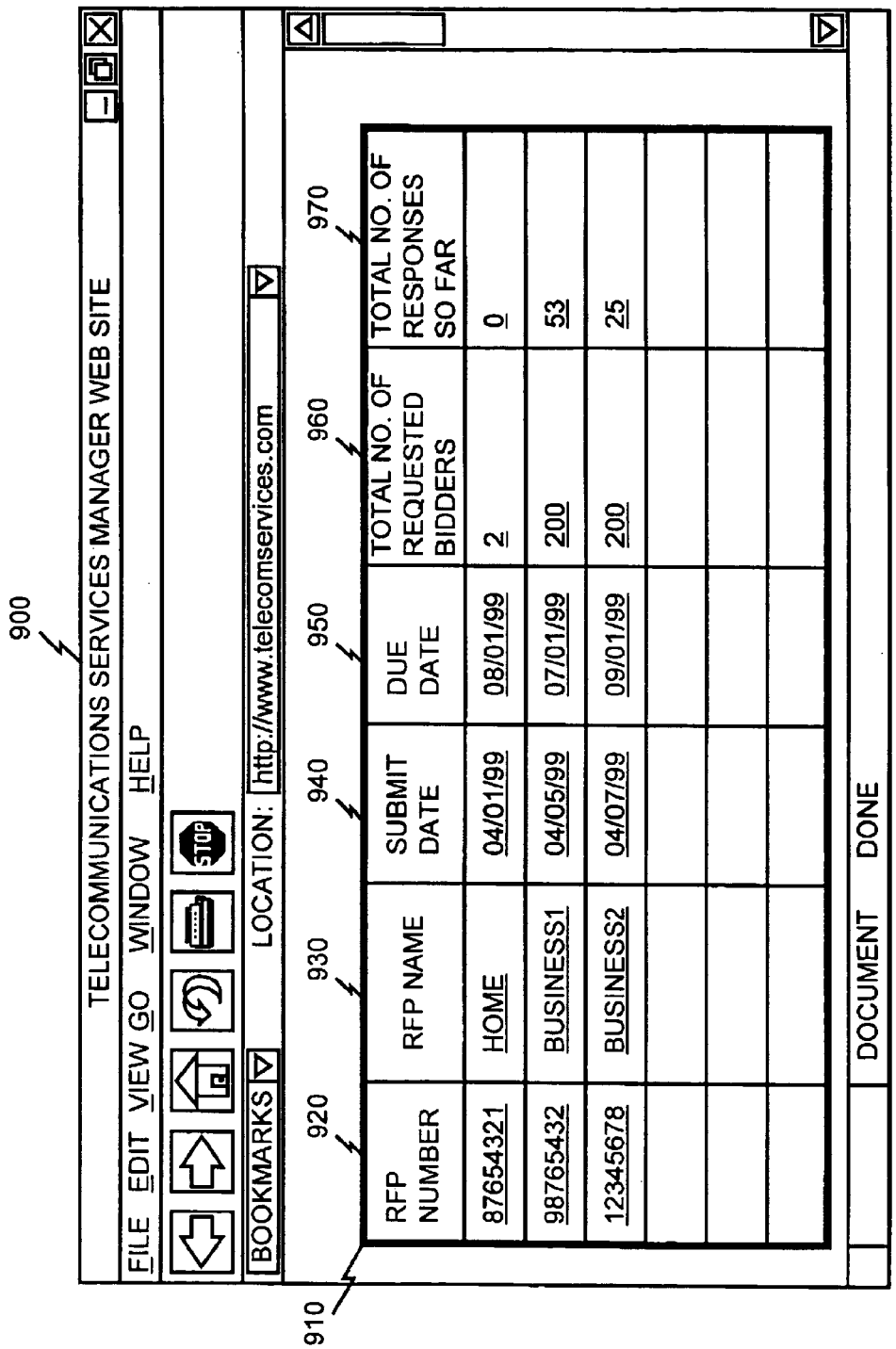
FIG. 9A is a diagram of an exemplary user interface containing an RFP summary report.

FIG. 9A is a diagram of an exemplary user interface in the form of a web page 900 containing an RFP summary report 910 consistent with the present invention. The summary report 910 includes an RFP number 920, an RFP name 930, a submit date 940, a due date 950, a total number of requested bidders 960, and a total number of responses so far 970. The RFP number 920 uniquely identifies an RFP. The buyer may have submitted more than one RFP and, therefore, may have more than one RFP number. The RFP name 930 is the name that the buyer provided for the RFP.

The submit date 940 is the date that the buyer completed the RFP. The due date 950 is the date by which all sellers must respond to the RFP to have their RFP replies considered by the buyer. The total number of requested bidders 960 is the total number of sellers on the RFP distribution list. The total number of responses so far 970 is the number of responses received from the sellers to date.

TSM 140 determines whether the buyer desires detailed information regarding a particular RFP shown in the RFP summary report based on input from the buyer [step 810] (FIG. 8A). If so, TSM 140 generates and displays a detailed report for the RFP [step 815].

Figure 9B:
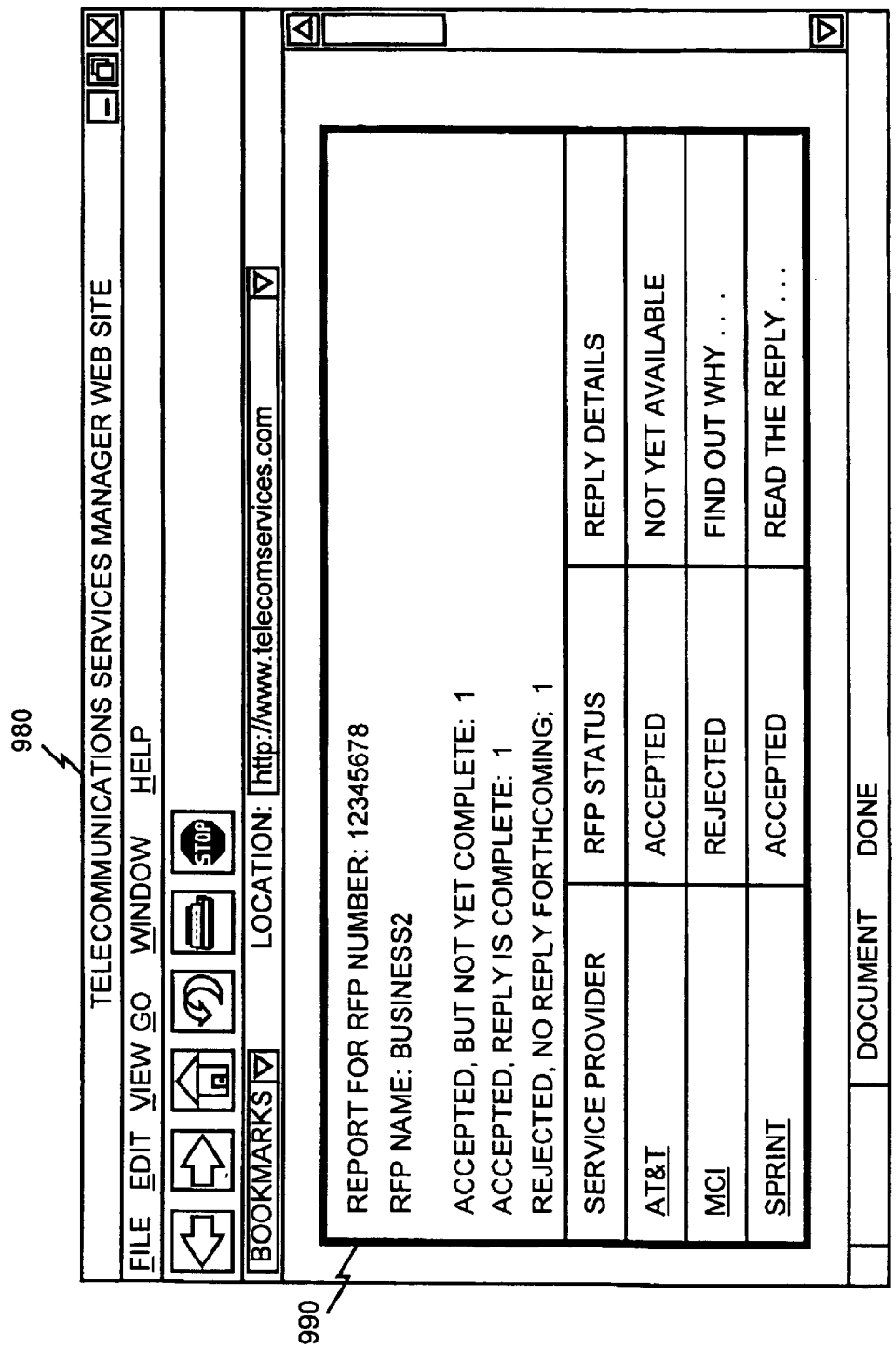
FIG. 9B is a diagram of an exemplary user interface containing an RFP detailed report.

FIG. 9B is a diagram of an exemplary user interface in the form of a web page 980 containing an RFP detailed report 990 consistent with the present invention. The detailed report 990 includes both the RFP number and name, as well as the status of the sellers' analysis. The status might include "Accepted, but not yet complete," "Accepted, reply is complete," or "Rejected, no reply forthcoming." The report 990 might also identify the sellers on the distribution list and the status of each reply. The buyer may select one of the sellers from the report to read the reply or find out why the RFP was rejected.

TSM 140 determines whether the buyer desires detailed information regarding any particular RFP reply based on input from the buyer [step 820] (FIG. 8A). If so, TSM 140 displays the reply for the buyer [step 825]. Alternatively, TSM 140 might email a copy of the reply to the buyer. If the buyer wants to review another RFP reply [step 830], TSM 140 displays the reply for the buyer [step 825]. If the buyer finally decides to place an order [step 835], TSM 140 generates an order form containing the specifics from the seller's RFP reply and displays it along with the seller's contractual terms and conditions [step 840] (FIG. 8B).

If the buyer accepts the terms and conditions [step 845], TSM 140 sends an alert to the selected seller indicating the buyer's intent to order, along with the buyer's contact information [step 850]. Of course, TSM 140 might inform the seller, and possibly all sellers, of the buyer's contact information at some earlier point. Once selected, the seller may contact the buyer to sign a contract for the desired telecommunication services.

TSM 140 also notifies all of the rejected sellers that the buyer does not intend to order from them [step 855]. Finally, TSM 140 sends a confirmation to the buyer and updates the buyer's RFP status information [step 860].

Processing for Reviewing Industry Information

Figure 10:
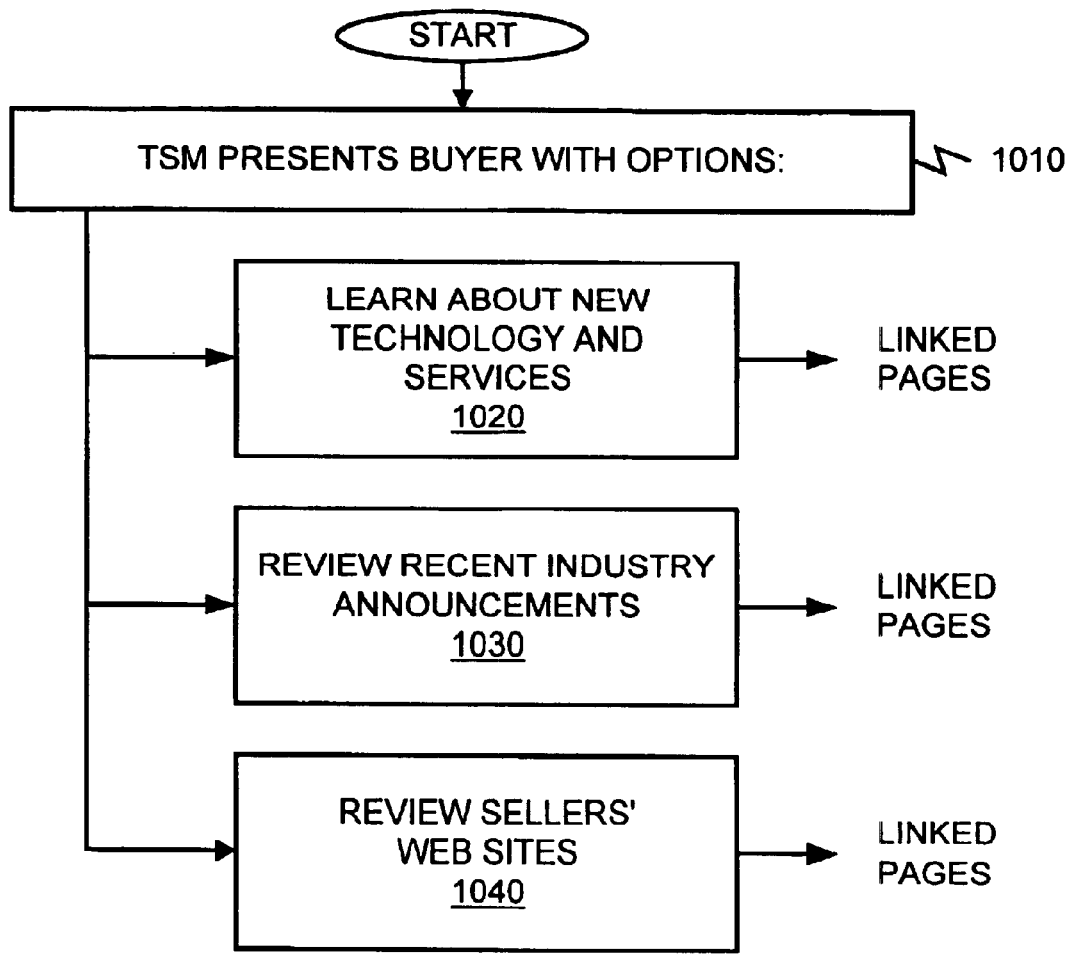
FIG. 10 is a flowchart of processing for reviewing industry information in a manner consistent with the present invention.

FIG. 10 is a flowchart of processing for reviewing industry information in a manner consistent with the present invention. When a buyer indicates a desire to review industry information, TSM 140 presents the buyer with several options [step 1010], such as to learn about new technology and services, to review recent industry announcements, and to review sellers' web sites.

If the buyer wants to learn about new technology and services [step 1020], TSM 140 links the buyer to web pages providing such information using conventional technology. If the buyer wants to review recent industry announcements [step 1030], TSM 140 links the buyer to web pages providing this information using conventional technology. If the buyer wants to review sellers' web sites [step 1040], TSM 140 links the buyer to these web sites over the network 130 using conventional technology.

Processing for Changing Buyer Account Information

Figure 11:
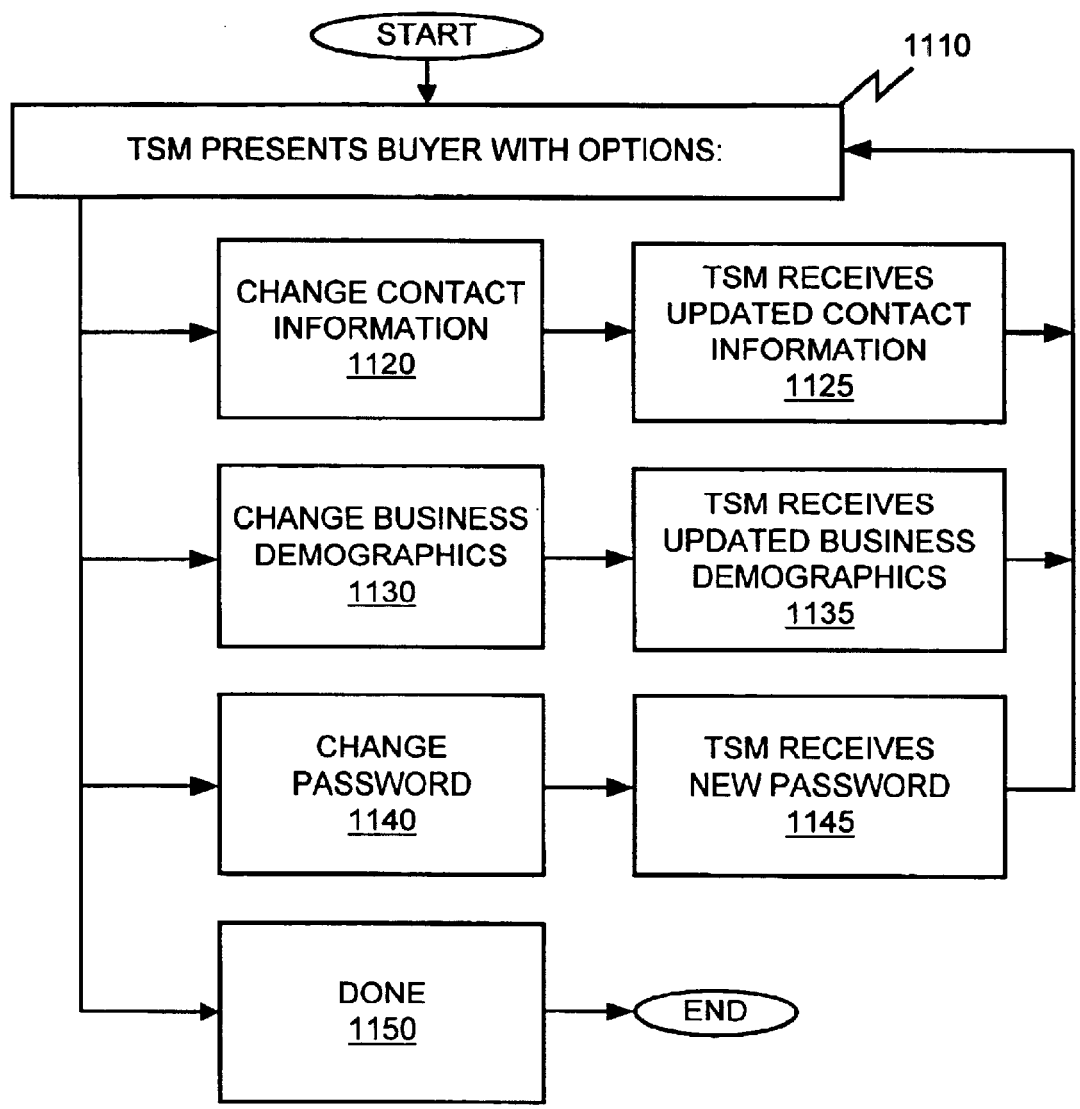
FIG. 11 is a flowchart of processing for changing buyer account information in a manner consistent with the present invention.

FIG. 11 is a flowchart of processing for changing buyer account information in a manner consistent with the present invention. When the buyer wants to change the buyer's account information, TSM 140 presents the buyer with several options [step 1110], such as to change contact information, to change business demographics, and to change password.

If the buyer wants to change the contact information [step 1120], TSM 140 presents the buyer with the current information and permits the buyer to change it. TSM 140 receives the updated contact information and stores it [step 1125]. If the buyer wants to change the business demographics [step 1130], TSM 140 presents the buyer with the current information and permits the buyer to change it. TSM 140 receives the updated business demographics and stores it [step 1135].

If the buyer wants to change the password [step 1140], TSM 140 prompts the buyer to enter the current password and then the new password twice. TSM receives the new password, and if the current password is correct and the two entries of the new password match, TSM 140 records the new password [step 1145]. When the buyer completes all changes, the buyer so indicates [step 1150].

CONCLUSION

The systems and methods consistent with the present invention provide a forum through which buyers can purchase telecommunication services from a variety of sellers. The present invention levels the playing field by giving buyers more power than they presently have in the buy-sell process.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the RFP approval process has been described as a group of sellers receiving an RFP and separately determining whether to approve or reject it. Alternatively, TSM 140 may contain a database of previously generated replies from the sellers. TSM 140 may query the database using the terms of the RFP and obtain one or more replies to present to the buyer.

What is claimed is:

1. A computer-implemented method, comprising:
   aggregating a plurality of buyers for purchasing at least one telecommunication service as a group;
   obtaining information regarding prior use of the at least one telecommunication service by at least one of the plurality of buyers;
   generating a request for purchasing the at least one telecommunication service, the request including the information regarding the prior use;
   presenting the request to a plurality of providers of telecommunication services;
   receiving replies from the providers in response to the request;
   presenting the replies to at least one of the buyers in the group;
   receiving a selection from the at least one buyer in response to the replies; and
   notifying a provider of the selection.

2. The method of claim 1, wherein the generating a request includes:
   compiling the request from information received from the group during the aggregating step.
3. The method of claim 2, wherein the compiling includes:
   obtaining contact information for the group,
   obtaining a name for the group, and
   assigning an initial password to the group.
4. The method of claim 2, wherein the compiling includes:
   identifying each of the buyers in the group.
5. The method of claim 1, wherein the generating a request includes:
   identifying billing preferences for the at least one telecommunication service.
6. The method of claim 1, wherein the generating a request includes:
   compiling a list of providers to receive the request; and
   wherein the presenting the request includes:
      granting access to the request to only the providers on the list.
7. The method of claim 1, wherein the generating a request includes:
   compiling a list of providers to receive the request; and
   wherein the presenting the request includes:
      transmitting the request to only the providers on the list.
8. The method of claim 1, wherein the generating a request includes:
   qualifying the group to verify an identity of at least one of the buyers; and
   wherein the presenting the request includes:
   distributing the request to the providers only when the group is qualified.
9. The method of claim 1, further comprising:
   presenting, to the group, contractual terms and conditions for providing the at least one telecommunication service from the notified provider, and
   receiving an acceptance of the terms and conditions from the group.
10. A system for purchasing telecommunication services, comprising:
    means for aggregating a plurality of buyers for purchasing at least one telecommunication service as a group;
    means for obtaining information regarding prior use of the at least one telecommunication service by at least one of the plurality of buyers;
    means for generating a request for purchasing the at least one telecommunication means for presenting the request to a plurality of sellers of telecommunication service, the request including the information regarding the prior use;
    means for receiving replies from the sellers in response to the request;
    means for presenting the replies to at least one of the buyers in the group;
    means for receiving a selection from the at least one buyer in response to the replies; and
    means for notifying a seller of the selection.
11. A system for purchasing telecommunication services in a network connecting buyers and sellers of telecommunication services, the system comprising:
    a memory that stores data; and
    a processor, connected to the memory, that aggregates a plurality of the buyers for purchasing at least one telecommunication service as a group, generates a request for purchasing the at least one telecommunication service, the request including information on prior use of telecommunication services of the group, presents the request to a plurality of the sellers, receives replies from the sellers in response to the request, presents the replies to the group, receives a selection from the group in response to the replies, and notifies a seller of the selection.
12. The system of claim 11, wherein when generating the request, the processor is associated with aggregating the buyers.
13. The system of claim 12, wherein when compiling the request, the processor is further configured to obtain contact information from the group, to obtain a buyer name for the group, and to assign an initial password to the group.
14. The system of claim 12, wherein when compiling the request, the processor is further configured to identify each of the buyers in the group.
15. The system of claim 11, wherein when generating the request, the processor is further configured to identify billing preferences for the at least one telecommunication service.
16. The system of claim 11, wherein when generating the request the processor is further configured to obtain information regarding prior use of telecommunication services of the group.
17. The system of claim 11, wherein when generating the request, the processor is further configured to compile a list of sellers to receive the request, and when presenting the request, the processor is further configured to grant access to the request to only the sellers on the list.
18. The system of claim 11, wherein when generating the request, the processor is further configured to compile a list of sellers to receive the request, and when presenting the request, the processor is further configured to distribute the request to only the sellers on the list.
19. The system of claim wherein when generating the request, the processor is further configured to verify an identity of the group, and when presenting the request, the processor is further configured to present the request to the sellers only when the identity is verified.
20. The system of claim 11, wherein the processor is further configured to present contractual terms and conditions, to the group, for providing the at least one telecommunication service from the notified seller, and to receive an acceptance of the terms and conditions from the group.
21. A computer-readable medium configured to store instructions that cause a computer to perform the steps of:
    aggregating a plurality of buyers for purchasing at least one telecommunication service as a group;
    obtaining information regarding prior use of the at least one telecommunication service by at least one of the plurality of buyers;
    generating a request for purchasing the at least one telecommunication service; the request including the information regarding the prior use;
    presenting the request to a plurality of providers of telecommunication services;
    receiving replies from the providers in response to the request;
    presenting the replies to at least one of the buyers in the group;
    receiving a selection from the at least one buyer in response to the replies; and
    notifying a provider of the selection.

* * * * *